US007356991B2

(12) United States Patent
Kim et al.

(10) Patent No.: US 7,356,991 B2
(45) Date of Patent: Apr. 15, 2008

(54) HYDRAULIC CONTROL DEVICE OF AN EXCAVATOR WITH IMPROVED LOADING PERFORMANCE ON A SLOPE

(75) Inventors: Hyeong Ho Kim, Incheon (KR); Won Sun Sohn, Gyeunggi-do (KR)

(73) Assignee: Doosan Intracore Co., Ltd., Ichon (KR)

( * ) Notice: Subject to any disclaimer, the term of this patent is extended or adjusted under 35 U.S.C. 154(b) by 225 days.

(21) Appl. No.: 11/305,772

(22) Filed: Dec. 15, 2005

(65) Prior Publication Data

US 2006/0179691 A1 Aug. 17, 2006

(30) Foreign Application Priority Data

Dec. 16, 2004 (KR) ..................... 10-2004-0107334

(51) Int. Cl.
*F16D 31/02* (2006.01)

(52) U.S. Cl. ............................ 60/421; 91/511; 60/422

(58) Field of Classification Search ................. 60/421, 60/422; 91/511

See application file for complete search history.

(56) References Cited

U.S. PATENT DOCUMENTS 4,875,337 A * 10/1989 Sugiyama et al. ............ 60/421
6,430,922 B2 * 8/2002 Tohji .......................... 60/421

* cited by examiner

*Primary Examiner*—F. Daniel Lopez
(74) *Attorney, Agent, or Firm*—Lee, Hong, Degerman, Kang & Schmadeka

(57) ABSTRACT

A hydraulic control device of an excavator is provided for controlling combined operation of boom-raising and swing on a slope. A swing priority valve (20) is provided on a pressured fluid supply line (8) that connects a first hydraulic pump (1) to a boom high-speed control valve (7). If an excavator performs its tasks on a slope, the swing priority valve (20) is automatically shifted under a control of an electronic controller (28) into a throttling position to thereby restrict hydraulic flow through the boom high-speed control valve (7) so that an increased amount of hydraulic flow can be supplied to a swing motor (14), thus increasing a swing operating pressure more rapidly than a boom operating pressure and consequently facilitating combined operation of boom-raising and swing on a slope.

3 Claims, 4 Drawing Sheets

HYDRAULIC CONTROL DEVICE OF AN EXCAVATOR WITH IMPROVED LOADING PERFORMANCE ON A SLOPE

This application claims the benefit of the Korean Patent Application No. 10-2004-0107334, filed on Dec. 16, 2004, which is hereby incorporated by reference as if fully set forth herein.

BACKGROUND OF THE INVENTION

1. Field of the Invention

The present invention relates to a hydraulic control device of an excavator, and more particularly to a hydraulic control device for improving loading performance in case of a loading-on-truck on a slope by a combined operation of boom-raising and swing.

2. Description of the Related Art

The hydraulic excavator performs 'front works', such as digging and ground leveling, by the operations of 'front-work-devices' such as a bucket, an arm, a boom and the like, or performs 'combined operation' by simultaneous operations of the front-work-devices and a upper swing body, such as loading-on-truck.

As the hydraulic excavator commonly carry out digging on level ground, a hydraulic control device of the hydraulic excavator is usually designed in such a manner that the boom operation is superior to others. As a consequence, the boom operation, particularly boom-raising usually responds more quickly than the swing motion.

The afore-mentioned phenomenon will be described with reference to FIG. 1, which shows a conventional hydraulic control system of the hydraulic excavator. The hydraulic control system includes a first hydraulic pump 101 and a second hydraulic pump 102. A swing control valve 106 and a boom high-speed control valve 107 are connected to a hydraulic supply line 103 of the first hydraulic pump 101 in parallel through each parallel lines 105,106, whereas a boom low-speed control valve 111 and an arm high-speed control valve 116 are connected in parallel to a hydraulic supply line 104 of the second hydraulic pump 102 through each parallel lines 112, 113. Outlet ports of the boom high-speed control valve 107 and the boom low-speed control valve 111 are connected to boom cylinders 115 through a confluence line 120.

When the boom low-speed control valve 111 is shifted alone, only one of two hydraulic pumps, i.e., the second hydraulic pump 102 supplies its flow rate to the boom cylinders so as to operate them in a low speed. When the boom low-speed control valve 111 and the boom high-speed control valve 107 are all shifted, the flow rate discharged from both of two hydraulic pumps 101, 102 are confluent in the confluence line 120 and then supplied to the boom cylinders 115 so as to operate the boom in a relatively high speed. Reference numeral 118 designates an arm cylinder and reference numeral 117 represents an arm low-speed control valve.

Taking into account that the hydraulic excavators to perform digging on level ground, the hydraulic control system shown and set forth above is designed to ensure that the boom operating speed becomes faster than the swing speed in case of combined operation of boom-raising and swing. In other words, when the combined operation of boom-raising and swing is carried out on level ground, flow rate of a hydraulic pump is supplied to the boom cylinder more than the swing motor, so that boom operating pressure becomes higher than the swing operation pressure as shown FIG. 2. As a result, the swing operation is carried out only with torque corresponding to the boom operating pressure.

With the conventional hydraulic control system described above, however, in case that the combined operation of boom-raising and swing, e.g., loading-on-truck operations is performed on a slope, swing operation substantially does not occur until rest-inertia of the boom get decreased at the beginning of the combined operation of boom-raising and swing. This causes a problem that the loading-on-truck operations cannot be smoothly performed.

SUMMARY OF THE INVENTION

To solve the above mentioned problems of the prior art, the purpose of the present invention is to provide a hydraulic control device that facilitates swing motion of a swing body in case of a hydraulic excavator performing the combined operation of boom-raising and swing, such as loading-on-truck operations on a slope, whereas assuring smooth motion of the boom in case of usual operations on level ground.

To achieve the purpose, the present invention provides a hydraulic control device comprising a first hydraulic pump, a second hydraulic pump, a swing control valve in fluid communication with the first hydraulic pump for controlling hydraulic flow from the first hydraulic pump to a swing motor, a boom high-speed control valve disposed downstream of the swing control valve and in fluid communication with the first hydraulic pump via a pressured fluid supply line for controlling hydraulic flow from the first hydraulic pump to boom cylinders, and a boom low-speed control valve for controlling hydraulic flow from the second hydraulic pump to the boom cylinders, further comprising: a working-on-slope detecting means for detecting a tilt angle of the excavator and outputting a working-on-slope signal if the tilt angle detected is greater than a predetermined value; and a swing priority valve provided on the pressured fluid supply line for the boom high-speed control valve and throttling the pressured fluid supply line to supply the hydraulic flow rate from the first hydraulic pump to the swing control valve prior to the boom high-speed control valve, in case of the working-on-slope signal being provided from the working-on-slope detecting means and at the same time a swing control pilot pressure for controlling the swing control valve being provided thereto.

The present invention further comprises a swing priority control line for delivering a swing control pilot pressure to the swing priority valve, and a selector valve provided on the swing priority control line to open the swing priority control line if the working-on-slope signal is provided from the working-on-slope detecting means or connect the swing priority control line to a tank if no working-on-slope signal is detected from the working-on-slope detecting means.

Also, it is desirable that the working-on-slope detecting means comprises a level for detecting the tilt angle of the excavator and generating the working-on-slope signal if the detected tilt angle is greater than a predetermined value.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE INVENTION

A preferred embodiment of a hydraulic control device of an excavator according to the present invention will now be described in detail with reference to the accompanying drawings.

Figure 1:
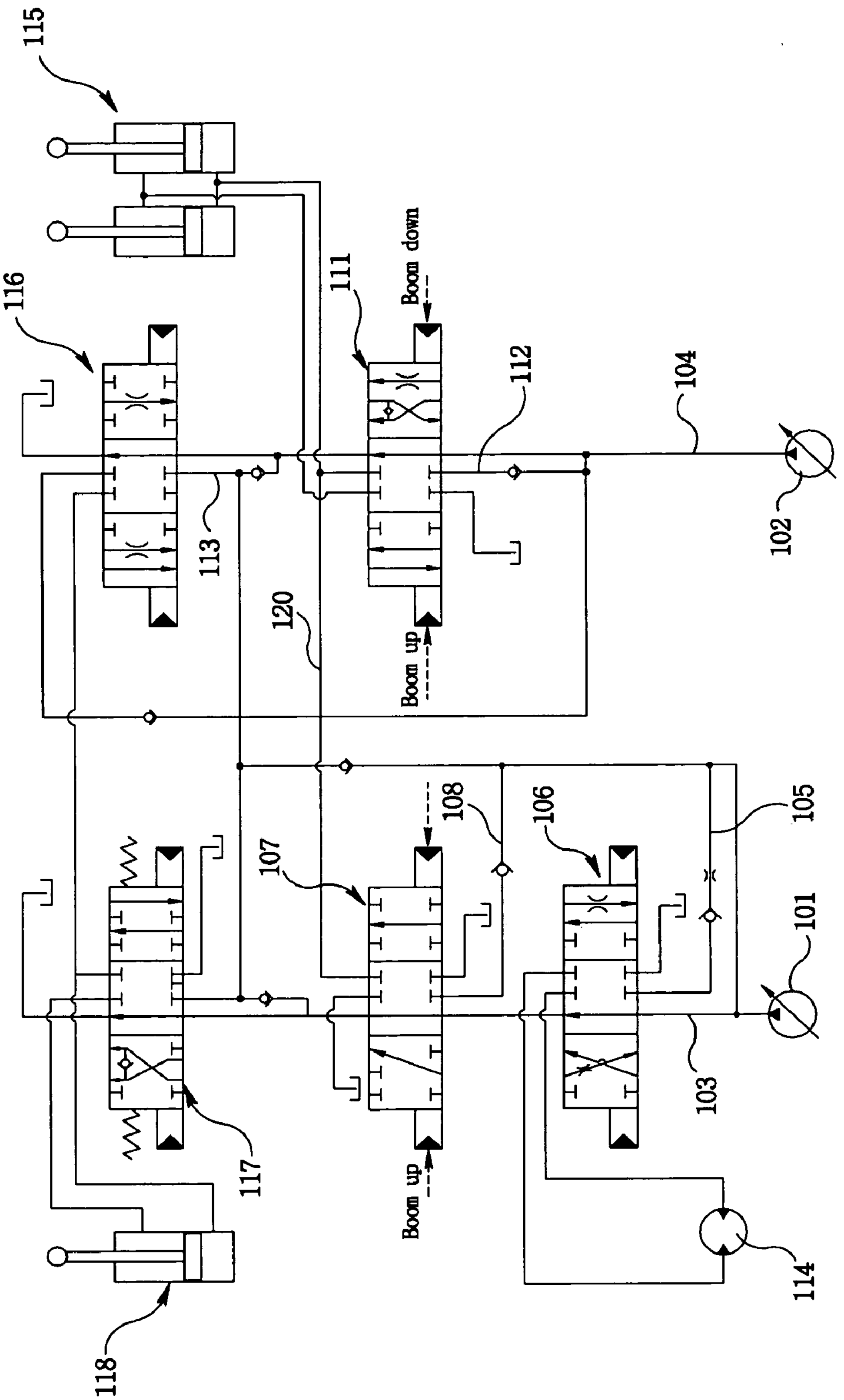
FIG. 1 (PRIOR ART)
FIG. 1 shows a hydraulic circuit of a prior art for controlling the combined operation of boom-raising and swing.
Figure 2:
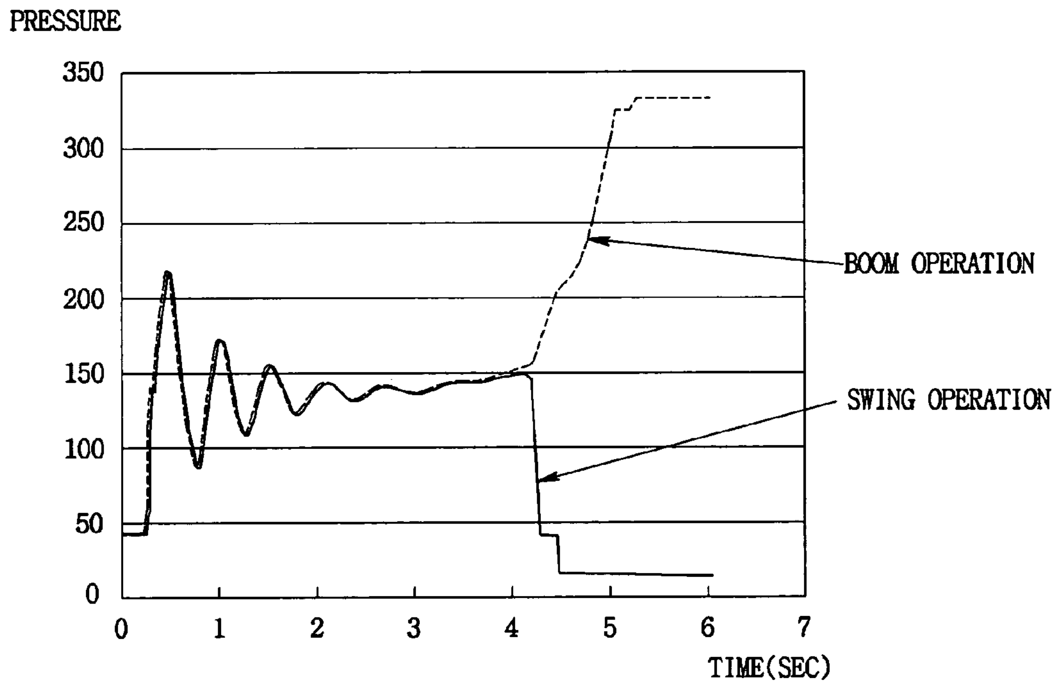
FIG. 2 (PRIOR ART)
FIG. 2 is a graph showing relationship between boom operating pressure and swing operating pressure during the combined operation of boom-raising and swing of the prior art excavator of a prior art.
Figure 3:
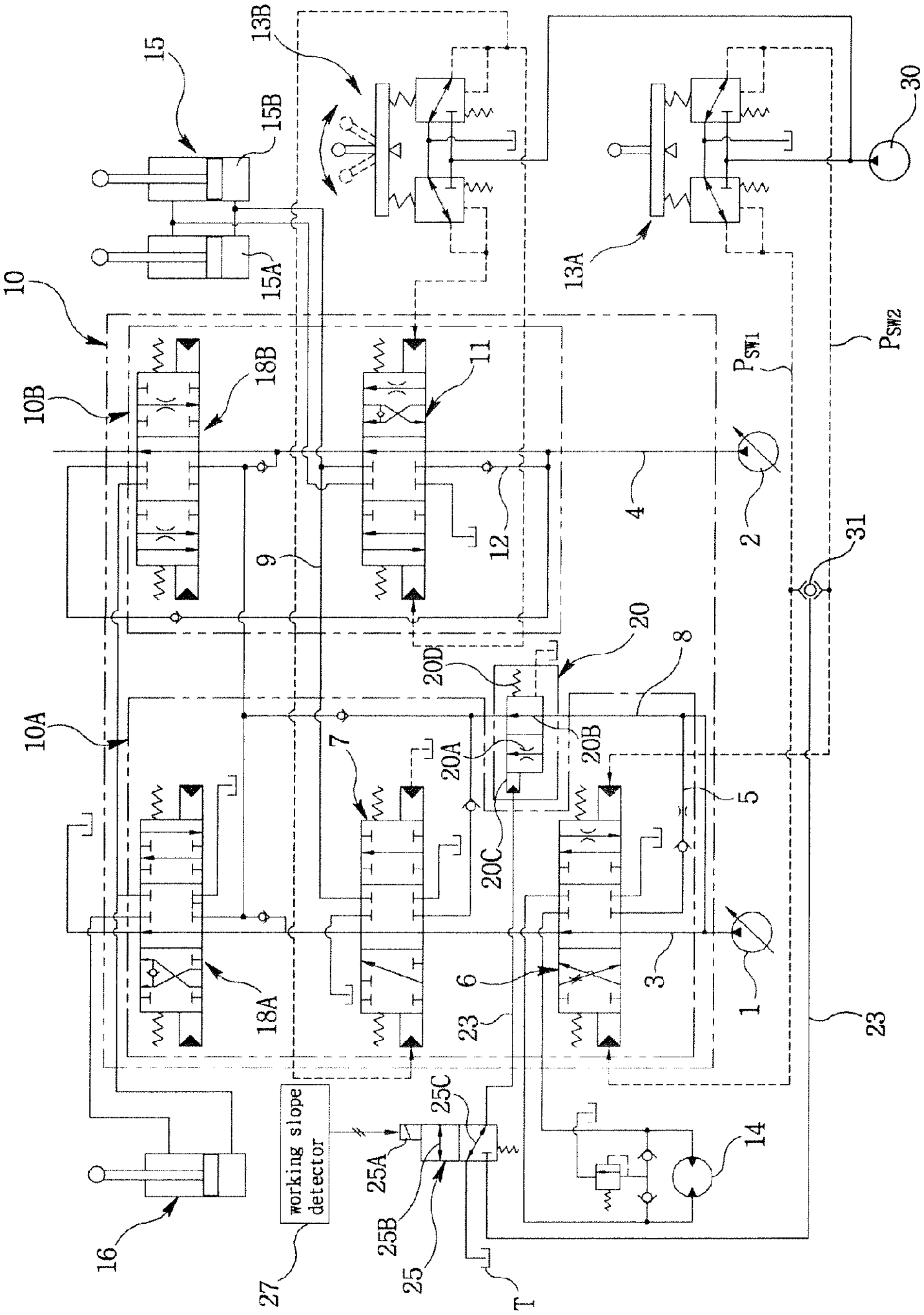
FIG. 3 shows a hydraulic circuit of a hydraulic control device of an excavator for controlling the combined operation of boom-raising and swing in accordance with the present invention.

As shown in FIG. 3, a hydraulic control device of an excavator according to the present invention includes a first variable displacement hydraulic pump 1 (hereafter referred to as "a first hydraulic pump"), a second variable displacement hydraulic pump 2 (hereafter referred to as "a second hydraulic pump") and a pilot pump 30, which are driven by an engine (not shown). The hydraulic control device further includes control valve unit 10 for controlling the hydraulic flow discharged from the two hydraulic pumps 1, 2, to operate a plurality of hydraulic actuators such as a hydraulic swing motor 14, boom cylinders 15, an arm cylinder 16 and the like. The hydraulic control device of the present invention still further includes remote control valves 13A, 13B for providing pilot pressures, which are produced by reducing pressure of the hydraulic flow discharged from the pilot pump 30, to a plurality of valves in the control valve unit 10, respectively.

The control valve unit 10 comprises a swing control valve 6 for controlling actuation of the swing motor 14, boom control valves 7, 11 for controlling actuation of the boom cylinders 15 and arm control valves 18A, 18B for controlling actuation of the arm cylinder 16.

The boom control valves are composed of a boom low-speed control valve 11 for operating the boom cylinder 15 in relatively lower speed and a boom high-speed control valve 7 for operating the boom cylinder 15 in relatively higher speed.

Similarly, the arm control valves are composed of an arm low-speed control valve 18A for operating the arm cylinder 16 in relatively lower speed and an arm high-speed control valve 18B for operating the arm cylinder 16 in relatively higher speed.

The control valve unit 10 includes a first control valve group 10A and a second control valve group 10B. The first control valve group 10A comprises the swing control valve 6, the boom high-speed control valve 7 and the arm low-speed control valve 18A, all of which are in fluid communication with the first hydraulic pump 1 through a first bypass line 3. The second control valve group 10B comprises the boom low-speed control valve 11 and the arm high-speed control valve 18B, both of which are in fluid communication with the second hydraulic pump 2 through a second bypass line 4.

The swing control valve 6, the boom high-speed control valve 7 and the arm low-speed control valve 18A in the first control valve group 10A are connected to the first bypass line 3 in tandem and are in fluid communication with the first hydraulic pump 1 through pressured fluid supply lines 5, 8.

The swing control valve 6 and the boom high-speed control valve 7 are shiftable in either of left and right directions by the pilot pressures provided from the remote control valves 13A, 13B so that they can supply hydraulic flow for swing motion and boom high-speed actuation to the swing motor 14 and the boom cylinders 15, respectively.

Likewise, the boom low-speed control valve 11 of the second control valve group 10B is connected to the second bypass line 4 and communicates with the second hydraulic pump 2 through a pressured fluid supply line 12. The boom low-speed control valve 11 is shiftable in either of left and right directions by the pilot pressures provided from the pilot valve 13B so that it can supply hydraulic flow for boom low-speed actuation to the boom cylinders 15.

No description will be offered regarding the arm low-speed control valve 18A and the arm high-speed control valve 18A in light of the fact that they play no meaningful role in the hydraulic control device of an excavator of the present invention.

Outlet ports of the boom high-speed control valve 7 and the boom low-speed control valve 11 are connected through a confluence line 9. the hydraulic flow of the first hydraulic pump 1 through the boom high-speed control valve 7 and the hydraulic flow of the second hydraulic pump 2 through the boom low-speed control valve 11 are confluent together and supplied to piston-side chambers 15A, 15B of the boom cylinders 15 through the confluence line 9.

A swing priority valve 20 is provided on the pressured fluid supply line 8 for delivering the flow rate of the first hydraulic pump 1 to the boom high-speed control valve 7. The swing priority valve 20 throttles the pressured fluid supply line 8 by a swing priority pilot pressure so as to reduce the flow rate of the first hydraulic pump 1 to the boom cylinders 15, thereby relatively increasing the flow rate of the first hydraulic pump 1 supplied to the swing motor 14.

The swing priority valve 20 has an orifice 20A for throttling the pressured fluid supply line 8 and a free passage 20B for allowing the hydraulic flow to pass through the pressured fluid supply line 8 with no restriction. The swing priority valve 20 includes a pilot port 20C provided at one side and a compression spring 20D at the opposite side. The pilot port 20C is in fluid communication with outlet of a shuttle valve 31 through a swing priority control line 23. The shuttle valve 31 detects a swing priority control pressure from swing pilot pressures of swing control pilot pressure lines Psw1, Psw2 and provides it to the pilot port 20C of swing priority valve 20 through the swing priority control line 23.

The swing priority valve 20 is normally biased toward a fully opened position by the action of the compression spring 20D, as illustrated in FIG. 3 and can be shifted into a throttling position against the biasing force of the compression spring 20D when the swing priority control pressure is applied to the pilot port 20C. In the fully opened position, the free passage 20B of the swing priority valve 20 is in communication with the pressured fluid supply line 8, thereby allowing the hydraulic flow to pass through the pressured fluid supply line 8 with no restriction. In the throttling position, the orifice 20A of the swing priority valve 20 is communication with the pressured fluid supply line 8, thereby throttling the pressured fluid supply line 8 so that the hydraulic flow supplied to the boom high-speed control valve 7 is reduced.

With the arrangement noted above, if a pressured fluid is supplied into one of the swing control pilot pressure lines Psw1, Psw2 from the pilot pump 30 through the pilot valve 13A, a swing control pilot pressure is developed in the swing priority control line 23 and applied to the pilot port 20C of the swing priority valve 20. This enables the swing priority valve 20 to be shifted from the fully opened position into the throttling position, whereby a restricted amount of hydraulic flow is fed to the boom high-speed control valve 7 through the pressured fluid supply line 8, while an increased amount of hydraulic flow is supplied the swing control valve 6. As a consequence, the swing operation pressure becomes higher than the boom operating pressure so that the swing motion of the swing body is prior to the boom motion.

For the swing priority control to be effective only in case of the combined operation of boom-raising and swing on a slope, a selector valve 25 is provided on the swing priority control line 23.

The selector valve 25 is a solenoid-operated valve and has a solenoid 25A, which is electrically connected to a working-on-slope detecting means as described below.

The working-on-slope detecting means 27 may be a level, which detects a tilt angle of the excavator and generates 'working-on-slope signal' if the tilt angle detected by the level is greater than a predetermined value. The predetermined tilt angle is preferably 10 degrees.

The selector valve 25 includes a first fluid passage 25B for allowing the pilot port 20C of the swing priority valve 20 to be connected to the swing priority control line 23 and a second fluid passage 25C for draining the swing priority control pressure of the swing priority control line 23 to the tank.

When the working-on-slope signal from the working-on-slope detecting means 27 is applied to the solenoid 25A of the selector valve 25, the selector valve 25 is shifted to the position of the first fluid passage 25B and delivers the swing priority control pressure to the pilot port 20C of the swing priority valve 20 so as to shift the swing priority valve 20 into the throttling position including the orifice 20A. The swing priority valve 20 throttles the flow rate towards the boom high-speed control valve 7 so as to increase the hydraulic flow supplied to the swing control valve 6.

When no working-on-slope signal from the working-on-slope detecting means 27 is detected, that is, in case of working-on-level ground, the selector valve 25 keeps in the position of the second fluid passage 25C and delivers no swing priority control pressure to the pilot port 20C of the swing priority valve 20. The swing priority valve 20 keeps in the full-open-position and then allows the hydraulic flow to be supplied to the boom high-speed control valve 7 with no throttles.

Now, the hydraulic control device of an excavator according to the present invention will be described below.

(1) Combined Operation of Boom-raising and Swing on Level Ground

In case the excavator performs the combined operation of boom-raising and swing on level ground, namely, when the excavator works on level ground of no greater than 10 degrees, no working-on-slope signal of the working-on-slope detecting means 27 is applied to the solenoid 25A of the selector valve 25. The selector valve 25 keeps in the drain position of the second fluid passage 25C and drains the pilot pressure in the pilot port 20C of the swing priority valve 20 to tank T.

The swing priority valve 20 maintains at the full-opened position, thereby dispensing the hydraulic flow discharged from the first hydraulic pump 1 to the swing motor 14 and/or the boom cylinders 15 in correspondence to relationship between the swing operating pressure and the boom operating pressure.

If the operator manually actuates the remote control valves 13A, 13B to generate a plurality of pilot pressure for loading-on-truck operations, the boom low-speed control valve 11, the boom high-speed control valve 7 and the swing control valve 6 are shifted to the left or the right in view of FIG. 3 by pilot pressures, respectively.

The swing control valve 6 delivers the hydraulic flow supplied from the first hydraulic pump 1 through the pressured fluid supply line 5 to the swing motor, thereby rotating the swing body.

At the same time, the boom cylinders 15 are actuated by the hydraulic flow supplied from the two hydraulic pump 2 through the boom low-speed control valve 11 and from the first hydraulic pump 1 through the boom high-speed control valve 7. This ensures that the combined operation of boom-raising and swing is performed in a smooth manner.

Figure 4A:
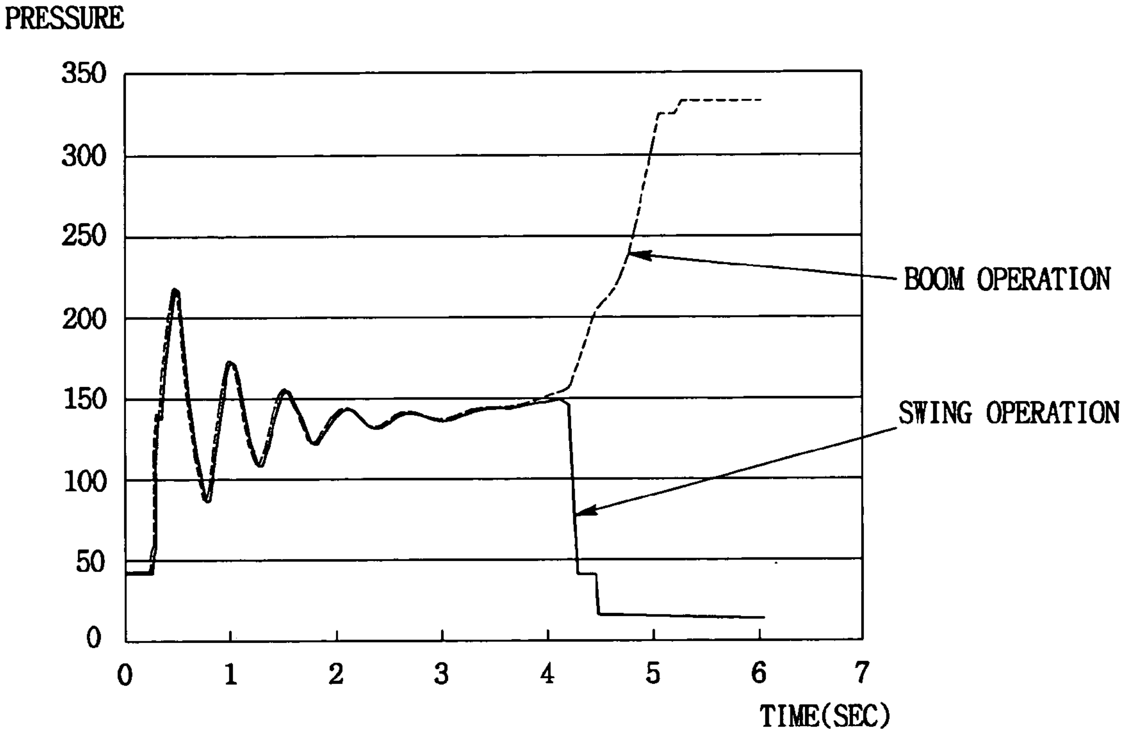
FIG. 4A is a graph showing relationship between a boom operating pressure and a swing operating pressure during the combined operation of boom-raising and swing performed on level ground by an excavator incorporating the hydraulic control device of an excavator according to the present invention.

By controlling the hydraulic flow as noted above, the boom operating pressure and the swing operating pressure are kept substantially the same at the beginning of the work-on-level ground as illustrated in FIG. 4A. This is because there is no need to intentionally increase the amount of hydraulic flow fed to the swing motor 14 at the time of conducting the combined operation of boom-raising and swing on level ground.

(2) Combined Operation of Boom-raising and Swing on a Slope

In case that the excavator performs the combined operation of boom-raising and swing on a slope, namely, when the excavator works on a slope inclined more than 10 degrees, working-on-slope signal is outputted to the solenoid 25A of the selector valve 25 from the working-on-slope detecting means 27. The selector valve 25 is shifted to the position of the first fluid passage 25B and delivers the swing priority control pressure to the pilot port 20C of the swing priority valve 20 so as to shift the swing priority valve 20 into the throttling position of the orifice 20A. The swing priority valve 20 throttles the flow rate supplied to the boom high-speed control valve 7, thereby increasing the hydraulic flow supplied to the swing control valve 6.

Figure 4B:
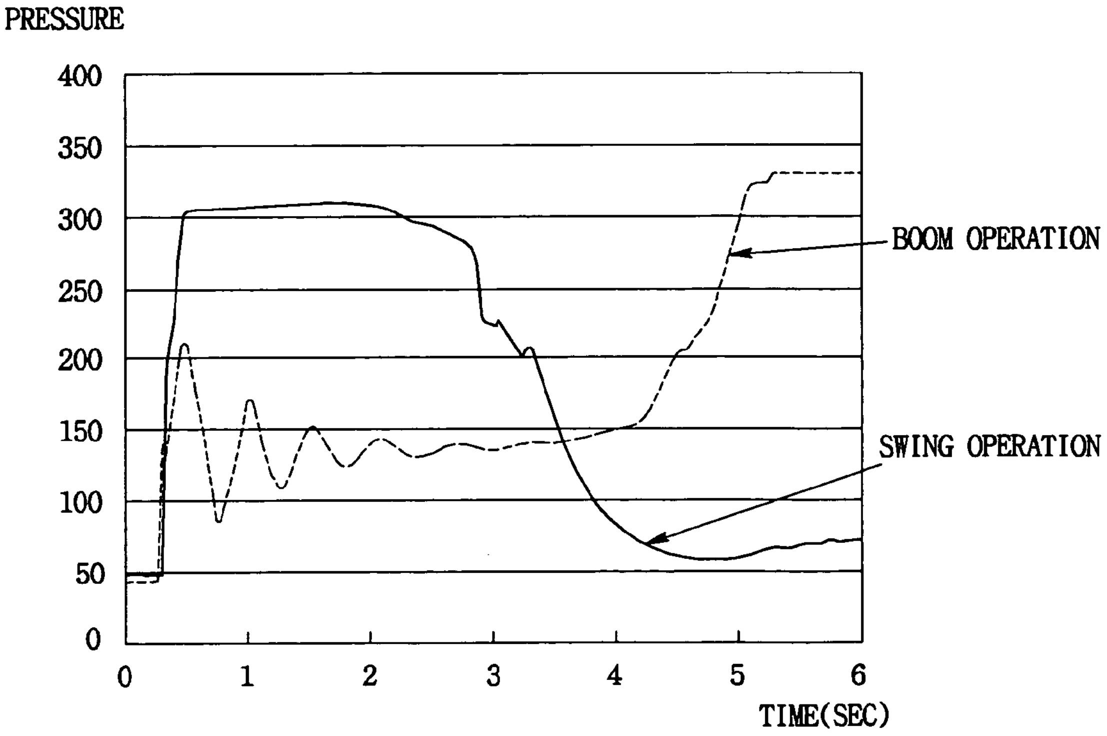
FIG. 4B is a graph showing relationship between a boom operating pressure and a swing operating pressure during the combined operation of boom-raising and swing according to the present invention.

By controlling the hydraulic flow as noted above, the swing operating pressure applied to the swing motor 14 becomes far higher than the boom operating pressure in the beginning of a swing combined operation on a slope, as illustrated in FIG. 4B. As a result, this makes loading-on-truck on a slope to be smoothly performed.

As described in the foregoing, according to the present invention, the combined operation of boom-raising and swing, e.g. loading-on-truck operations, on a slope can be performed in a facilitated manner by detecting the tilt angle of the excavator and intentionally increasing the swing operating pressure relative to the boom operating pressure.

Although certain preferred embodiments of the present invention have been described in the foregoing, it will be apparent to those skilled in the art that various changes or modifications may be made thereto within the scope of the invention defined by the appended claims.

What is claimed is:

1. A hydraulic control device of an excavator comprising a first hydraulic pump (1), a second hydraulic pump (2), a swing control valve (6) in fluid communication with the first hydraulic pump (1) for controlling hydraulic flow from the first hydraulic pump (1) to a swing motor (14), a boom high-speed control valve (7) disposed at downstream of the swing control valve (6) and in fluid communication with the first hydraulic pump (1) via a pressured fluid supply line (8) for controlling hydraulic flow from the first hydraulic pump (1) to boom cylinders (15), and a boom low-speed control valve (11) for controlling hydraulic flow from the second hydraulic pump (2) to the boom cylinders (15), further comprising:

a working-on-slope detecting means (27) for detecting a tilt angle of the excavator and outputting a working-on-slope signal if the tilt angle detected is greater than a predetermined value; and a swing priority valve (20) provided on the pressured fluid supply line (8) for the boom high-speed control valve (7) and throttling the hydraulic flow rate supplied to the boom high-speed control valve (7) from the first hydraulic pump (1), thereby relatively increasing the hydraulic flow rate to the swing control valve (6), in case of the working-on-slope signal being provided from the working-on-slope detecting means (27) and at the same time a swing control pilot pressure (SW1, SW2) for shifting the swing control valve (6) being provided thereto.

2. The device as recited in claim 1, further comprising a swing priority control line (23) for delivering a swing control pilot pressure to the swing priority valve (20), and a selector valve (25) provided on the swing priority control line (23) to open the swing priority control line in case the working-on-slope signal is provided from the working-on-slope detecting means (27) or connect the swing priority control line (23) to a tank in case of no working-on-slope signal from the working-on-slope detecting means (27).

3. The device as recited in claim 2, wherein the working-on-slope detecting means (27) comprises a level for detecting the tilt angle of the excavator and generating the working-on-slope signal if the tilt angle detected is greater than a predetermined value.

* * * * *